United States Patent
Bickhart et al.

(10) Patent No.: US 9,992,154 B2
(45) Date of Patent: Jun. 5, 2018

(54) LAYER 3 CONVERGENCE FOR EVPN LINK FAILURE

(71) Applicant: Juniper Networks, Inc., Sunnyvale, CA (US)

(72) Inventors: Ryan Bickhart, San Francisco, CA (US); Nitin Singh, Fremont, CA (US); Wen Lin, Andover, MA (US); Hassan C. Hosseini, San Jose, CA (US)

(73) Assignee: Juniper Networks, Inc., Sunnyvale, CA (US)

(*) Notice: Subject to any disclaimer, the term of this patent is extended or adjusted under 35 U.S.C. 154(b) by 161 days.

(21) Appl. No.: 15/198,948

(22) Filed: Jun. 30, 2016

(65) Prior Publication Data
US 2018/0006995 A1 Jan. 4, 2018

(51) Int. Cl.
| | |
|---|---|
| *H04L 12/28* | (2006.01) |
| *H04L 29/12* | (2006.01) |
| *H04L 12/721* | (2013.01) |
| *H04L 12/46* | (2006.01) |
| *H04L 12/751* | (2013.01) |

(Continued)

(52) U.S. Cl.
CPC .......... *H04L 61/103* (2013.01); *H04L 12/462* (2013.01); *H04L 12/4641* (2013.01); *H04L 45/02* (2013.01); *H04L 45/66* (2013.01); *H04L 12/66* (2013.01); *H04L 45/50* (2013.01)

(58) Field of Classification Search
CPC ............................ H04W 60/005; H04W 80/04
See application file for complete search history.

(56) References Cited

U.S. PATENT DOCUMENTS

| | | | |
|---|---|---|---|
| 8,467,316 B1 | 6/2013 | Goli et al. | |
| 8,787,149 B1 * | 7/2014 | Ramanathan | H04L 45/58 370/216 |
| 9,019,814 B1 | 4/2015 | Mohanty et al. | |

(Continued)

FOREIGN PATENT DOCUMENTS

EP   3018866 A1   5/2016

OTHER PUBLICATIONS

Extended Search Report from counterpart European Application No. 17165585.5, dated Jul. 11, 2017, 5 pp.

(Continued)

*Primary Examiner* — Shukri Taha
(74) *Attorney, Agent, or Firm* — Shumaker & Sieffert, P.A.

(57) ABSTRACT

A network device is configured to provide, via an Ethernet segment with a customer network, active-active multi-homing L2 virtual bridge connectivity to the customer network using an EVPN instance (EVI) and L3 routing using an IRB interface that is a L3 routing interface assigned to the EVI; to receive, from a peer PE device of the EVPN instance, an EVPN route comprising an L2-L3 binding for a customer device of the customer network and associating the L2-L3 binding with the Ethernet segment, the L2-L3 binding comprising an L2 and an L3 address assigned to the customer device, wherein the peer PE device provides, with the network device and via the Ethernet segment, active-active multi-homing L2 virtual bridge connectivity to the customer network; and to forward, via the Ethernet segment and based at least on the L2-L3 binding received from the peer PE device, an L3 packet to the customer device.

20 Claims, 4 Drawing Sheets

(51) Int. Cl.
*H04L 12/723* (2013.01)
*H04L 12/66* (2006.01)

(56) References Cited

U.S. PATENT DOCUMENTS

| | | | |
|---|---|---|---|
| 2013/0235876 A1* | 9/2013 | Sajassi | H04L 41/12 |
| | | | 370/401 |
| 2015/0006757 A1* | 1/2015 | Boutros | H04L 45/14 |
| | | | 709/242 |
| 2017/0141963 A1* | 5/2017 | Chalapathy | H04L 41/12 |

OTHER PUBLICATIONS

Sajassi et al., "BGP MPLS-Based Ethernet VPN," RFC 7432, Internet Engineering Task Force (IETF), Feb. 2015, 56 pp.
Sajassi et al., "Integrated Routing and Bridging in EVPN," L2VPN Workgroup Internet Draft, draft-ietf-bess-evpn-inter-subnet-forwarding-01, Oct. 18, 2015, 26 pp.
"Configuring Ethernet VPNs," Layer 2 VPNs and VPLS Feature Guide for Routing Devices, Juniper Networks, Inc., Mar. 25, 2016, pp. 233-341.
Yong et al., "Network Virtualization Edge (NVE)," Network Working Group Internet Draft, draft-yong-nvo3-nve-03, Feb. 13, 2014, 20 pp.
Rosen et al., "BGP/MPLS IP Virtual Private Networks (VPNs)," RFC 4364, Network Working Group, Feb. 2006, 47 pp.

* cited by examiner

LAYER 3 CONVERGENCE FOR EVPN LINK FAILURE

TECHNICAL FIELD

The disclosure relates to computer networks and, more particularly, to routing packets within computer networks.

BACKGROUND

A computer network is a collection of interconnected computing devices that can exchange data and share resources. Example network devices include layer two devices that operate within the second layer (L2) of the Open Systems Interconnection (OSI) reference model, i.e., the data link layer, and layer three devices that operate within the third layer (L3) of the OSI reference model, i.e., the network layer. Network devices within computer networks often include a control unit that provides control plane functionality for the network device and forwarding components for routing or switching data units.

An Ethernet Virtual Private Network (EVPN) may be used to extend two or more remote layer two (L2) customer networks through an intermediate layer three (L3) network (usually referred to as a provider network), in a transparent manner, i.e., as if the intermediate L3 network does not exist. In particular, the EVPN transports L2 communications, such as Ethernet packets or "frames," between customer networks via traffic engineered label switched paths (LSP) through the intermediate network in accordance with one or more multiprotocol label switching (MPLS) protocols. In a typical configuration, provider edge (PE) devices (e.g., routers and/or switches) coupled to the customer edge (CE) network devices of the customer networks define label switched paths (LSPs) within the provider network to carry encapsulated L2 communications as if these customer networks were directly attached to the same local area network (LAN). In some configurations, the PE devices may also be connected by an IP infrastructure in which case IP/GRE tunneling or other IP tunneling can be used between the network devices.

In an EVPN, L2 address learning (also referred to as "MAC learning") in a PE device occurs in the control plane rather than in the data plane (as happens with traditional bridging) using a routing protocol. For example, in EVPNs, a PE device typically uses the Border Gateway Protocol (BGP) (i.e., an L3 routing protocol) to advertise to other provider edge network devices the MAC addresses learned from the local consumer edge network devices to which the PE device is connected. A PE device may use BGP route advertisement messages to announce reachability information for the EVPN, where the BGP route advertisements specify one or more MAC addresses learned by the PE device instead of L3 routing information.

In an EVPN configuration referred to as the active-active EVPN multi-homing mode of operation, an Ethernet segment includes multiple PE devices that provide multi-homed connectivity for one or more local customer edge (CE) devices. Moreover, the multiple PE device provide transport services through the intermediate layer 3 network to a remote PE device, and each of the multiple PE devices in the Ethernet segment forwards Ethernet frames in the segment for the CE device. In the active-active EVPN multi-homing mode of operation, all active PE routers of the multi-homing PE routers are allowed to forward traffic to and from an Ethernet segment that make up the set of L2 links connecting the multi-homed CE device with the multi-homing PE routers. Additional example information with respect to EVPN is described in "BGP MPLS-Based Ethernet VPN," Request for Comments (RFC) 7432, Internet Engineering Task Force (IETF), February, 2015, the entire contents of which are incorporated herein by reference.

To facilitate inter-subnet forwarding among customer endpoints across different L3 subnets, a PE device may be configured with an EVPN instance that uses an integrated routing and bridging (IRB) interface to locally perform L3 routing of inter-subnet traffic rather than via an L3 gateway. A PE device configured with an IRB interface for an EVPN instance may therefore both locally route inter-subnet traffic and bridge intra-subnet traffic. Additional example information with respect to integrated routing and bridging for EVPNs is described in "Integrated Routing and Bridging in EVPN," draft-ietf-bess-evpn-inter-subnet-forwarding-01, L2VPN Workgroup, Oct. 18, 2015, the entire contents of which are incorporated herein by reference. In response to locally learning a L2-L3 binding for a customer endpoint bridged by an EVPN instance, a PE router may advertise the binding using a BGP EVPN route with a BGP Network Layer Reachability Information (NLRI) that indicates the L2 address and L3 address for the customer endpoint are reachable via the PE router. In RFC 7432, this type of BGP EVPN route is referred to as a MAC/IP advertisement route (Type 2).

SUMMARY

In general, techniques are described for layer 3 (L3) forwarding, with a multi-homing PE router for a multi-homed Ethernet segment of an Ethernet Virtual Private Network (EVPN) instance, of traffic for hosts (or "customer devices") of the Ethernet segment using layer 2-layer 3 (hereinafter, "L2-L3" or "MAC/IP") binding information previously advertised by a multi-homing PE router for the Ethernet segment. In some examples, multiple PE routers of a layer 3 network are configured to provide active-active mode multi-homing to a customer network using an Ethernet segment of an EVPN instance. As part of EVPN procedures, each of the multiple PE routers advertises one or more Ethernet Auto-Discovery (A-D) per Ethernet segment (ES) routes for the Ethernet segment that indicate the PE router provides layer 2 (L2) reachability for the Ethernet segment. In an EVPN active-active multi-homing topology, any of the multi-homing PE routers may learn L2-L3 bindings for locally connected hosts of the multi-homed customer network and advertise the L2-L3 bindings to other PE routers of the EVPN instance, including to the peer multi-homing PE routers for the Ethernet segment.

In response to determining a failure of a link of an Ethernet segment between one of the multi-homing PE routers and the multi-homing site, the PE router with the failed link may withdraw the corresponding set of Ethernet A-D per ES routes for the Ethernet segment. Upon receiving an indication of the withdrawal by the PE router with the failed link, a peer multi-homing PE router may identify one or more L2-L3 bindings learned from the failed PE router via the EVPN control plane and may begin forwarding traffic according to the identified L2-L3 bindings. For instance, for each L2-L3 binding learned from the PE router with the failed link, the peer PE router may proactively create a dynamic Address Resolution Protocol (ARP) entry or Neighbor Discovery Protocol (NDP) entry according to the L2-L3 binding and install the entry to an ARP or NDP table for the EVPN instance. In addition, the peer PE router may advertise the identified L2-L3 bindings to solicit EVPN traffic from remote PE routers for the Ethernet segment.

The techniques may provide one or more advantages. For example, by installing the L2-L3 bindings learned via the EVPN control plane from the peer multi-homing PE router with the failed link, a multi-homing PE router for an Ethernet segment may forward incoming L3 traffic requiring an L3 lookup without having to locally resolve an L2 address for the hosts associated with the L2-L3 bindings using, e.g., Address Resolution Protocol (ARP) requests or Neighbor Discovery Protocol (NDP) neighbor solicitation. As another example, by advertising the L2-L3 bindings to remote PE routers via the EVPN control plane, the multi-homing PE router may enable remote PE routers of the multi-homed site to learn the L2-L3 bindings association with the multi-homing PE router and more quickly solicit EVPN traffic from the remote PE routers for the L2-L3 bindings, i.e., without having to first locally learn/resolve the L2-L3 bindings prior to advertisement. In this way, the techniques may improve network convergence.

In some examples, a method includes receiving, by a first provider edge (PE) router of a layer 3 network, configuration data defining an Ethernet segment for an Ethernet virtual private network (EVPN) instance. The configuration data configures the first PE router to provide active-active multi-homing layer 2 virtual bridge connectivity to a customer network using the Ethernet segment. The method includes receiving, by the first PE router and from a second PE router of the layer 3 network, a withdrawn route message specifying an Ethernet Auto-Discovery (A-D) route associated with the Ethernet segment. The method further includes, by the first PE router in response to receiving the withdrawn route message, determining one or more layer 2 address-layer 3 address (L2-L3) bindings received from the second PE router via an EVPN routing protocol for the EVPN instance for hosts connected to the first PE router via the Ethernet segment, and generating respective address resolution entries based on the one or more L2-L3 bindings. Each of the address resolution entries maps an L3 address for a host connected to the first PE router via the Ethernet segment to an L2 address for the host.

In some examples, a non-transitory computer-readable medium comprising instructions for causing one or more programmable processors of a provider edge (PE) device of an intermediate layer 3 network to: receive, by the first PE device of a layer 3 network, configuration data configuring the first PE device to provide, via an Ethernet segment with a customer network, active-active multi-homing layer 2 (L2) virtual bridge connectivity to the customer network using an Ethernet Virtual Private Network instance and layer 3 (L3) routing using an integrated routing and bridging (IRB) interface that is a L3 routing interface assigned to the EVPN instance; receive, by the first PE device from a second PE device of the EVPN instance, an EVPN route comprising an L2-L3 binding for a customer device of the customer network and associating the L2-L3 binding with the Ethernet segment, the L2-L3 binding comprising an L2 address and an L3 address that are assigned to the customer device, wherein the second PE device provides, with the first PE device and via the Ethernet segment, active-active multi-homing L2 virtual bridge connectivity to the customer network; and forward, by the first PE device via the Ethernet segment and based at least on the L2-L3 binding received from the second PE device, an L3 packet to the customer device.

In some examples, a network device is operable as a provider edge router, comprising: one or more processors operably coupled to a memory; wherein the one or more processors are configured to receive configuration data that configures the network device to provide, via an Ethernet segment with a customer network, active-active multi-homing layer 2 (L2) virtual bridge connectivity to the customer network using an Ethernet Virtual Private Network instance and layer 3 (L3) routing using an integrated routing and bridging (IRB) interface that is a L3 routing interface assigned to the EVPN instance; wherein the one or more processors are configured to receive, from a peer PE device of the EVPN instance, an EVPN route comprising an L2-L3 binding for a customer device of the customer network and associating the L2-L3 binding with the Ethernet segment, the L2-L3 binding comprising an L2 address and an L3 address that are assigned to the customer device, wherein the peer PE device provides, with the network device and via the Ethernet segment, active-active multi-homing L2 virtual bridge connectivity to the customer network; and wherein the one or more processors are configured to forward, via the Ethernet segment and based at least on the L2-L3 binding received from the peer PE device, an L3 packet to the customer device.

The details of one or more embodiments are set forth in the accompanying drawings and the description below. Other features, objects, and advantages will be apparent from the description and drawings, and from the claims.

BRIEF DESCRIPTION OF DRAWINGS

Like reference characters denote like elements throughout the figures and text.

DETAILED DESCRIPTION

Figure 1:
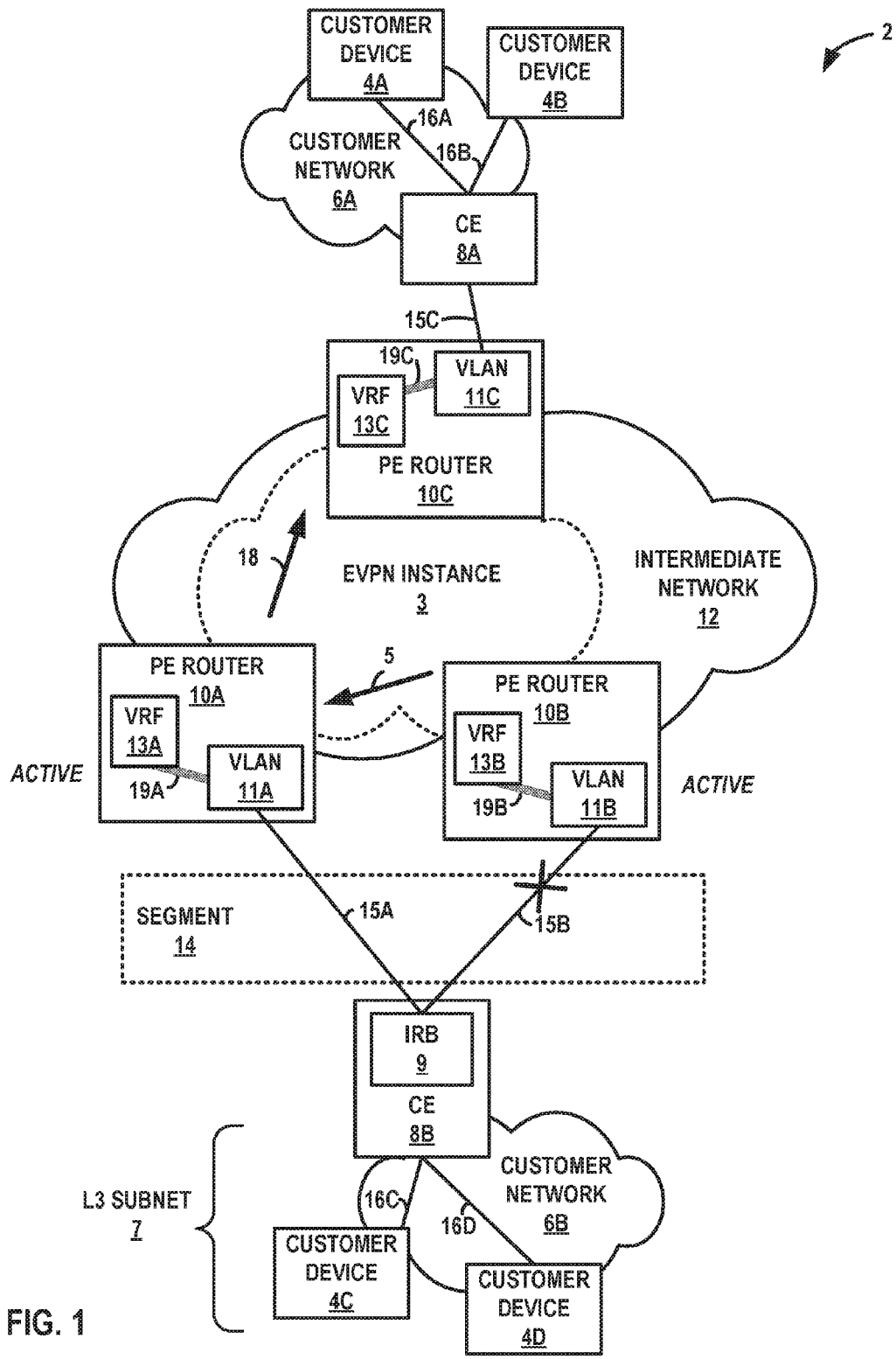
FIG. 1 is a block diagram illustrating an example system, in accordance with techniques of the disclosure.

FIG. 1 is a block diagram illustrating an example system, in accordance with techniques of the disclosure. In the example of FIG. 1, PE routers 10A-10C ("PE routers 10" or, more simply, "PEs 10") provide customer devices 4A-4D ("customer devices 4") associated with customer networks 6A-6B ("customer networks 6") with access to an intermediate layer 3 (L3) network (here, "intermediate network 12") via customer edge (CE) devices 8A-8B ("CEs 8"). Although described as routers, PE routers 10 may represent other types of PE devices capable of performing PE operations for an Ethernet Virtual Private Network (EVPN). Communication links 16A-16D may be Ethernet, ATM or any other suitable network connections.

PE routers 10 and CEs 8 may each represent a router, switch, or other suitable network devices that participates in a layer two (L2) virtual private network (VPN) (L2VPN) service, such as an EVPN. Customer networks 6 may be networks for geographically or logically separated sites of an enterprise or may represent networks for different customers of the intermediate network 12 (or tenants of a data center intermediate network). Each of customer devices 4 may represent one or more non-edge switches, routers, hubs, gateways, security devices such as firewalls, intrusion detection, and/or intrusion prevention devices, servers, computer terminals, laptops, printers, databases, wireless mobile devices such as cellular phones or personal digital assistants, wireless access points, bridges, cable modems, application accelerators, or other network devices. The configuration of network 2 illustrated in FIG. 1 is merely an example. For example, an enterprise may include any number of customer networks 6. Nonetheless, for ease of description, only customer networks 6A-6B are illustrated in FIG. 1.

Intermediate network 12 may represent a service provider network that is owned and operated by a service provider, which is usually large telecommunications entity or corporation. Intermediate network 12 represents an L3 computer network, where reference to a layer followed by a number refers to a corresponding layer in the Open Systems Interconnection (OSI) model. Intermediate network 12 is a L3 network in the sense that it natively supports L3 operations as described in the OSI model. Common L3 operations include those performed in accordance with L3 protocols, such as the Internet protocol (IP). L3 is also known as a "network layer" in the OSI model and the "IP layer" in the TCP/IP model, and the term L3 may be used interchangeably with the and "network layer" and "IP" throughout this disclosure.

Although not illustrated, intermediate network 12 may be coupled to one or more networks administered by other providers, and may thus form part of a large-scale public network infrastructure, e.g., the Internet. Consequently, customer networks 6 may be viewed as edge networks of the Internet where intermediate network is a service provider network. Intermediate network 12 may provide computing devices within customer networks 6 with access to the Internet, and may allow the computing devices within the customer networks to communicate with each other. In some cases, intermediate network 12 represents a data center L2/L3 switching fabric (or "data center fabric network") that interconnects CEs for tenants of the data center, where a tenant may represent an organization or a logical partitioning of resources, data, and/or applications within the data center.

Intermediate network 12 may include a variety of network devices other than PE routers 10. For instance, intermediate network 12 may include a route reflector, one or more provider routers (also known as "P" or "core" routers), switches, and so forth. In some examples, the route reflector (not shown) may reside within intermediate network 12 and along a path in a service provider network between two or more PE routers. Because of an internal BGP (IBGP) full-mesh requirement, some networks may use route reflectors to simplify configuration. Using a route reflector, routers are grouped into clusters, which are identified by numeric identifiers unique to an autonomous system (AS). Within the cluster, a BGP session is configured from a single router (the route reflector) to each internal peer. With this configuration, the IBGP full-mesh requirement may be met by the route reflector. To use route reflection in an AS, one or more routers are designated as a route reflector—typically, one per point of presence (POP). Route reflectors have the BGP ability to re-advertise routes learned from an internal peer to other internal peers. Rather than requiring all internal peers to be fully meshed with each other, route reflection may have only the route reflector be fully meshed with all internal peers.

Although additional network devices are not shown for ease of explanation, it should be understood that system 2 may comprise additional network and/or computing devices such as, for example, one or more additional switches, routers, hubs, gateways, security devices such as firewalls, intrusion detection, and/or intrusion prevention devices, servers, computer terminals, laptops, printers, databases, wireless mobile devices such as cellular phones or personal digital assistants, wireless access points, bridges, cable modems, application accelerators, or other network devices. Moreover, although the elements of system 2 are illustrated as being directly coupled, it should be understood that one or more additional network elements may be included along any of the illustrated links 15, 16, such that the network elements of system 2 are not directly coupled.

Intermediate network 12 may provide a number of residential and business services, including residential and business class data services (which are often referred to as "Internet services" in that these data services permit access to the collection of publically accessible networks referred to as the Internet), residential and business class telephone and/or voice services, and residential and business class television services. One such business class data service offered by a service provider intermediate network 12 includes L2 EVPN service. Intermediate network 12 that represents an L2/L3 switch fabric for one or more data centers may implement an L2 EVPN service. An EVPN is a service that provides a form of L2 connectivity across an intermediate L3 network, such as intermediate network 12, to interconnect two or more L2 customer networks, such as L2 customer networks 6, that may be located in different geographical areas (in the case of service provider network implementation) and/or in different racks (in the case of a data center implementation). Often, EVPN is transparent to the customer networks in that these customer networks are not aware of the intervening intermediate network and instead act and operate as if these customer networks were directly connected and formed a single L2 network. In a way, EVPN enables a form of a transparent LAN connection between two customer sites that each operates a L2 network and, for this reason, EVPN may also be referred to as a "transparent LAN service."

To configure an EVPN, a network operator of the intermediate network 12 configures, via configuration or management interfaces, various devices included within intermediate network 12 that interface with L2 customer networks 6. The EVPN configuration may include an EVPN instance (EVI), which consists of one or more broadcast domains. Generally, an EVI may be associated with a virtual routing and forwarding instance (VRF) on a PE router, such as any of PE routers 10A-10D. Consequently, multiple EVIs may be configured on PE routers 10 for Ethernet segment 14, as further described herein, each providing a separate, logical layer two (L2) forwarding domain. In this way, multiple EVIs may be configured that each includes one or more of PE routers 10A-10C. In some examples, Ethernet Tags are then used to identify a particular broadcast domain, e.g., a VLAN, in an EVI. A PE router may advertise an MPLS service label (or "MAC label," "MAC route label," or more simply "label") per-<ESI, Ethernet Tag> combination. This label assignment methodology is referred to as a per-<ESI, Ethernet Tag> label assignment. Alternatively, a PE router may advertise a unique label per MAC address. In still another example, a PE router may advertise the same single label for all MAC addresses in a given EVI. This label assignment methodology is referred to as a per-EVI label assignment. Such labels are advertised by PEs 10 in EVPN MAC advertisement routes.

An EVPN instance (EVI) 3 is configured within intermediate network 12 for customer networks 6 to enable devices 4 within customer networks 6 to communicate with one another via the EVI as if devices 4 were directly connected via a L2 network. As used herein, an EVI is an EVPN routing and forwarding instance spanning PE routers 10A-10C participating in the EVI. Each of PE routers 10 is configured with EVI 3 and exchanges EVPN routes to implement EVI 3.

As part of establishing EVI 3, PE routers 10A-10B trigger EVPN designated forwarder (DF) election for multi-homed Ethernet segment 14. This may be done, for example, by the PE routers 10A-10B that participates in Ethernet segment 14 outputting an EVPN route advertising an Ethernet Segment Identifier (ESI). In addition, for each EVI, the PE router outputs an EVPN route advertising an Ethernet Auto-Discovery (AD) route specifying the relevant ESI for the Ethernet segment for the EVI. Once the EVPN is operational for the {EVI, ESI} pair, PE routers 10A-10C output routing protocol messages to one another to announce media access control (MAC) addresses associated with devices 4. The topology of system 2 is an example. In some examples, the EVI 3 may include more or fewer (i.e., zero) multi-homed Ethernet segments.

For example, in typical operation, PE routers 10A-10C communicate using the Border Gateway Protocol (BGP) to transport BGP Network Layer Reachability Information (NLRI) for the EVPN and may define different EVPN route types for conveying EVPN information via the BGP routing protocol. The EVPN NLRI is typically carried in BGP using BGP Multiprotocol Extensions. An Ethernet Segment route advertised by each PE router 10A-10D using BGP includes a Route Distinguisher and Ethernet Segment Identifier. An Ethernet AD route advertised by each PE router 10A-10C for each EVI, specifies a Route Distinguisher (RD) (which may include, e.g., an IP address of the PE), ESI, Ethernet Tag Identifier, and MPLS label. Subsequent BGP media access control (MAC) routes output by PE router 10A-10C announce MAC addresses of devices 4 for the EVPN and include a RD, ESI, Ethernet Tag Identifier, MAC address and MAC address length, IP address and IP address length, and MPLS label.

In the example of FIG. 1, when providing the EVPN service to customer networks 6, PE routers 10 and CEs 8 perform MAC address learning to efficiently forward L2 network communications in system 2. That is, as PE routers 10 and CEs 8 forward Ethernet frames, the routers learn L2 state information for the L2 network, including MAC addressing information for devices 4 within the network and the physical ports through which devices 4 are reachable. PE routers 10 and CE 8 typically store the MAC addressing information in MAC tables associated with respective interfaces. When forwarding an individual Ethernet frame received on one interface, a router typically broadcasts the Ethernet frame to all other interfaces associated with the EVPN unless the router has previously learned the specific interface through which the destination MAC address specified in the Ethernet frame is reachable. In this case, the router forwards a single copy of the Ethernet frame out the associated interface.

Moreover, as PE routers 10 learn the MAC addresses for devices 4 reachable through local attachment circuits, the PE routers 10 use MAC address route advertisements of a layer three (L3) routing protocol (i.e., Multi-Protocol BGP (MP-BGP) in this example) to share the learned MAC addresses and to provide an indication that the MAC addresses are reachable through the particular PE router that is issuing the route advertisement. In the EVPN implemented using PE routers 10 for a given EVI, each of PE routers 10 advertises the locally learned MAC addresses to other PE routers 10 using a BGP route advertisement, also referred to herein as a "MAC route," "MAC Advertisement route," or "MAC/IP Advertisement." As further described below, a MAC route typically specifies an individual MAC address of devices 4 along with additional forwarding information, such as a route descriptor, route target, layer 2 segment identifier, MPLS label, etc. In this way, PE routers 10 use BGP to advertise and share the MAC addresses learned when forwarding layer two communications associated with the EVPN. Accordingly, PE routers 10 may perform both local learning and remote learning of MAC addresses.

Each of PE routers 10 uses MAC routes specifying the MAC addresses learned by other PE routers to determine how to forward L2 communications to MAC addresses that belong devices 4 connected to other PEs, i.e., to remote CEs and/or devices behind CEs operatively coupled to PE routers. That is, each of PE routers 10 determine whether Ethernet frames can be sent directly to a particular one of the other PE routers 10 or whether to treat the Ethernet frames as so called "BUM" traffic (Broadcast, Unidentified unicast or Multicast traffic) that is to be flooded within the EVPN based on the MAC addresses learning information received from the other PE routers.

As shown in FIG. 1, CEs 8 may be multi- and/or singly-homed to one or more of PE routers 10. In EVPN, a CE may be said to be multi-homed when it is coupled to two physically different PE routers on the same EVI when the PE routers are resident on the same physical Ethernet Segment. CE 8B is coupled to PE routers 10A and 10B via links 15A and 15B, respectively, where PE routers 10A and 10B are capable of providing access to EVPN for L2 customer network 6B via CE 8B. In instances where a given customer network (such as customer network 6B) may couple to service provider network 12 via two different and, to a certain extent, redundant links, the customer network may be referred to as being "multi-homed." In this example, CE 8B may be multi-homed to PE routers 10A and 10B because CE 8B is coupled to two different PE routers 10A and 10B via separate and, to a certain extent, redundant links 15A and 15B where both of PE routers 10A and 10B are capable of providing access to EVPN for L2 customer network 6B. Multi-homed networks are often employed by network operators so as to improve access to EVPN provided by service provider network 12 should a failure in one of links 15A and 15B occur. In a typical EVPN configuration, only the multi-homing PEs 10A-10B participate in DF election for each ESI. PE 10C not connected to the ESI has no direct knowledge of the DF election result for a given ESI.

In an active-active EVPN mode of operation (sometimes referred to as all-active), all of the links 15A and 15B forming the Ethernet segment 14 (and thus the multi-homed connection) are considered active in that PE routers 10A, 10B are both configured to actively exchange data traffic with CE 8B via respective links 15A and 15B. In active-active mode, each of PE routers 12A and 12B may also be configured with (or derive) a common Ethernet segment identifier (ESI) for Ethernet segment 14. CE 8B may be configured with a Link Aggregation Group (LAG) for links 15A and 15B of Ethernet segment 14 that CE 8B uses to reach PEs 10A and 10B. The CE 8B may employ a local hashing function to map traffic flows onto links in the LAG.

An EVPN, such as EVI 3 illustrated in FIG. 1, may operate over a Multi-Protocol Label Switching (MPLS) configured network and use MPLS labels to forward network traffic accordingly. MPLS is a mechanism used to engineer traffic patterns within Internet Protocol (IP) networks according to the routing information maintained by the routers in the networks. By utilizing MPLS protocols, such as the Label Distribution protocol (LDP) or the Resource Reservation Protocol with Traffic Engineering extensions (RSVP-TE), a source device can request a path through a network to a destination device, i.e., a Label Switched Path (LSP). An LSP defines a distinct path through the network to carry MPLS packets from the source device to a destination device. Using a MPLS protocol, each router along an LSP allocates a label and propagates the label to the closest upstream router along the path. Routers along the path add or remote the labels and perform other MPLS operations to forward the MPLS packets along the established path.

As shown in the example of FIG. 1, intermediate network 12 may provide an MPLS core or IP tunneling infrastructure for sending network packets from customer network 6A to and from customer network 6B. Each of PE routers 10A-10C implement the MPLS protocol and apply one or more MPLS labels, i.e., a label stack, to network packets in accordance with routing and forwarding information configured at each respective PE router. In an EVPN, a label stack applied to a network packet may include multiple labels. For instance, a label stack may include an outer label and an inner label.

The outer label serves as a "transport label" that uniquely identifies a PE router in an MPLS core. That is, each of PE routers 10A-10C may exchange control plane messages at configuration and startup that specify an outer label that uniquely identifies each respective PE router. For instance, PE router 10A may send control plane messages that specify an outer label that identifies PE router 10A to PE routers 10B-10C. PE routers 10B-10C may configure their respective forwarding units such that network packets that include the outer label corresponding to PE router 10A are forwarded to PE router 10A.

The inner label, or "service label," of the MPLS label stack provides EVPN-specific configuration information. As described above, EVPN defines Ethernet AD routes, MAC/IP advertisement routes, and Ethernet Segment routes, for instance. An Ethernet AD route, for example, may be structured according to the following format of Table 1:

TABLE 1

AD route advertisement

Route Distinguisher (8 octets)
Ethernet Segment Identifier (10 octets)
Ethernet Tag ID (4 octets)
MPLS Label (3 octets)

In one example, PE router 10A may send an Ethernet AD route to PE router 10C initially at startup and configuration that includes an MPLS label as shown above. PE router 10C may configure one or more of its forwarding units to apply the MPLS label of the Ethernet AD route from PE router 10A as the inner label in a label stack applied to network packets that are destined to PE router 10A for forwarding via the network identified by the Ethernet segment and Ethernet Tag ID. PE router 10C would then apply a transport label for reaching PE router 10A as the outer label in the label stack. In this way, the inner label provides EVPN-specification configuration information about the Ethernet AD route that PE router 10C uses to forward network packets in the EVPN.

For example, PE 10B may advertise an AD route for the Ethernet segment 14 to PEs 10A and 10C that indicate the PE 10B provides L2 reachability for the Ethernet segment 14. PE 10A may likewise advertise a similar AD route for the same Ethernet segment 14.

In some configurations, to provide flexibility and scalability, multiple bridge domains can be defined for a particular EVPN instance (EVI). One or more EVIs can be associated with a single L3 VPN virtual routing and forwarding instance (VRF). For example, each customer of the service provider network (or data center tenant) may be assigned a unique VRF; a customer/tenant can encompass one or more EVPN instances and one or more bridge domains (e.g., VLAN or VxLAN) per EVPN instance. To support this model, each configured bridge domain (including the default bridge domain for an EVPN instance) requires a IRB logical interface to perform the L2 and L3 functions. Each local bridge domain or local IRB interface for a PE router 10 may map to a unique IP subnet in the VRF for the PE router 10. IRB interfaces may be configured on each configured bridge domain including the default bridge domain for an EVPN instance.

In some examples, one or more of PE routers 10 may embed Network Virtualization Edge (NVE) functionality within the respective PEs, as described in "Network Virtualization Edge (NVE)," Feb. 13, 2014, https://tools.ietf.org/html/draft-yong-nvo3-nve-03, which is hereby incorporated by reference herein in its entirety. In some examples, a PE that implements NVE functionality may be referred to as an NVE device.

As shown in FIG. 1, PEs 10A-10C include respective VRFs 13A-13C ("VRFs 13") for the EVI 3 that includes customer networks 6. Generally, VRFs permits multiple routing tables to exist within a single physical router. An attachment circuit may be associated with a particular VRF, and the particular VRF may be configured to forward traffic for the attachment circuit. VRFs 13 may be configured to include functionality described in "BGP/MPLS IP Virtual Private Networks (VPNs)," February 2006, https://tools.ietf.org/html/rfc4364, which is hereby incorporated by reference herein in its entirety.

As shown in FIG. 1, Virtual Local Area Networks (VLANs) may be configured for PEs 10. Accordingly, PEs 10 may forward network packets to between customer networks 6 using the bridge domain defined by the VLANs. As shown in FIG. 1, PEs 10A-10C are configured with respective VLANs instances 11A-11C. Each instance may represent functionality implemented by the respective PE for forwarding network packets within one or more virtual layer 2 networks identified by a corresponding VLAN identifiers.

PEs 10 also implement integrated routing and bridging, which supports layer 2 bridging and layer 3 routing on the same interface. As such, integrated routing and bridging allows a router to route local packets to another routed interface or to another bridging domain that has a layer 3 protocol configured. Integrated Routing and Bridging (IRB) interfaces (or "IRBs") are logical interfaces that enable a PE or CE to recognize which packets are being sent to local addresses so that they are bridged whenever possible and are routed only when needed. Accordingly, IRBs may be used to locally route inter-subnet traffic. For instance, using one or more IRBs, a PE may route inter-subnet traffic between multiple VLANs configured for multiple IRBs for a routing instance of the PE.

In the example of FIG. 1, each of PEs 10 is illustrated as having a single IRB 19 associated with a VRF 13 and having a VLAN-based bridging domain of a VLAN 11. PE 10A includes IRB 19A with the VLAN 11A bridging domain; PE 10B includes IRB 19B with the VLAN 11B bridging domain; and PE 10C includes IRB 19C with the VLAN 11C bridging domain. IRBs 19 may serve as IP gateways for inter-subnet traffic for EVI 3. PE 10A, e.g., may be configured with multiple IRBs associated with VRF 13A and having different VLAN-based bridging domains and, accordingly, may route traffic between the VLANs using the multiple IRBs. One or more of PEs 10 may implement IRB as described in "Integrated Routing and Bridging in EVPN", ietf-bess-evpn-inter-subnet-forwarding, Oct. 18, 2015, https://tools.ietforg/html/draft-ietf-bess-evpn-inter-subnet-forwarding-01, which is hereby incorporated by reference herein in its entirety. VLAN 11A and VLAN 11B are virtual L2 networks for L3 subnet 7 reachable via PE router 10A, 10B.

CE 8B in this example is configured with IRB 9 having a bridging domain that provides L2 reachability to L3 subnet 7 that includes devices 4C, 4D. The IRB 9 may be configured with a L3 address (e.g., an IPv4/IPv6 address) that is within the bridging domains for IRBs 19A, 19B, such that the IRB 9 routing interface for CE 8B is reachable by the routing interfaces for IRBs 19A, 19B. In this way, IRB 9 provides L2/L3 reachability to L3 subnet 7B from PEs 10A, 10B. In some example, CE 8B is not configured with an IRB interface for EVI 3. In some examples, any of customer devices 4 may be directly coupled to PE routers 10 via links 15A, 15B.

In an EVPN instance, learning of layer 2 forwarding information (e.g., MAC learning) between PEs occurs not in the data plane (as happens with traditional bridging), but in the control plane. PEs 10A, 10B, and 10C can advertise the layer 2 addresses (e.g., MAC addresses) learned from the CEs 8A and 8B that are connected to them, along with an MPLS label, to other PEs in the control plane using a route advertisement, such as via Multiprotocol BGP (MP-BGP). As mentioned above, in an EVPN active-active multi-homing topology that implements integrated routing and bridging, any of the multi-homing PE routers 10A, 10B may learn L2-L3 (e.g., MAC/IP) bindings for locally connected hosts of the multi-homed customer network 6B, such as customer devices 4C and 4D, and advertise the L2-L3 bindings to other PE routers of the EVPN instance using EVPN routes, including to the peer multi-homing PE routers for the Ethernet segment 14.

As noted above, PEs 10 locally learn MAC addresses for customer devices 4 reachable via respective local attachment circuits. In some cases, PEs 10 may locally learn the IP addresses associated with respective MAC addresses in the control or management plane between the CEs 8 and the PE routers 10. As used hereinafter, an L2-L3 binding refers to an association between an L2 address and an L3 address for a customer device 4, and an "MAC/IP binding" refers to an association between a MAC address and an IP address for a customer endpoint 4. Alternatively, PE routers 10 may learn MAC/IP bindings in the data plane by snooping certain messages to or from CEs 8 (or directly from customer devices 4 in some topologies), such as Address Resolution Protocol (ARP) or Neighbor Discovery Protocol (NDP) messages. When a PE router 10 learns the IP address associated with a MAC address of a locally connected customer device 4, the PE router 10 may advertise the IP address along with the MAC address to other PE routers 10 by including it in an EVPN MAC/IP Advertisement route. The IP address may be an IPv4 address encoded using 4 octets or an IPv6 address encoded using 16 octets.

In some cases, an L2-L3 binding for customer device 4D, for instance, may be locally learned by PE router 10B but not locally learned by PE router 10A. Whether any of multi-homing PE 10A, 10B locally learns a L2-L3 binding for customer device 4D on Ethernet segment 14 may depend on load balancing by CE 8B. For example, the particular PE 10A, 10B which will receive a given traffic flow sourced by customer device 4D may depend on LAG hashing techniques that load-balances different traffic flows across the multi-homing PEs for Ethernet segment 14. For example, based on the LAG hashing towards the PEs 10A and 10B, PE 10B may receive an ARP request from customer device 4D for an IP address that is a gateway address for IRB 19B. PE 10B may learn the L2-L3 binding for customer device 4D via the ARP request/response. In some situations, such as when the number of unique traffic flows is low, or there happens to be low entropy in the packet fields used in hashing traffic by CE 8B towards the PEs 10A, 10B, only one of the multi-homing PEs 10A, 10B might learn a particular L2-L3 binding in the data plane for EVI 3.

Continuing with the above example, only PE 10B may locally learn the L2-L3 binding for customer device 4D. That is, PE 10A may not locally learn the L2-L3 binding for customer device 4D. However, PE 10B may send an EVPN MAC/IP advertisement route advertising the L2-L3 binding for customer device 4D, which may be received by PE 10A and installed to a routing table for EVI 3. PE 10A may remotely learn the L2-L3 binding for customer device 4D from PE 10B, in other words.

Link 15B of Ethernet segment 14 coupling PE 10B to the multi-homed site, customer network 6B, may subsequently fail (as depicted by an "X" mark in FIG. 1). As a result, the L2-L3 binding for customer device 4B locally learned only by PE 10B may be withdrawn by PE 10B from the EVPN control plane. As part of EVPN procedures, upon a failure in connectivity to the attached Ethernet segment 14 due to failure of link 15B or an interface of PE 10B configured for link 15B, e.g., PE 10B outputs a withdrawal message 5 to withdraw the corresponding set of Ethernet A-D per ES routes for Ethernet segment 14. Withdrawal message 5 may represent a withdrawn route message such as one or more withdrawn Ethernet A-D per ES routes that indicate PE 10B is withdrawing the specified set of one or more Ethernet A-D per ES routes for Ethernet segment 14 previously advertised by PE 10B.

According to RFC 7432 at Section 8.2, in response to receiving withdrawal message 5, PEs 10A, 10C may update their next-hop adjacencies for all MAC addresses associated with Ethernet segment 14. For example, the peer PE 10A may modify its forwarding information to invalidate MAC addresses associated with the Ethernet segment 14 and remotely learned from PE 10B, which may result in the loss of the L2-L3 binding for customer device 4D.

During the described link failure scenario and according to RFC 7432, the L2-L3 bindings for the Ethernet segment 14 locally learned only by PE 10B may be lost for a time before peer multi-homing PE 10A for Ethernet segment 14 is able to locally learn the L2-L3 bindings. Because customer device 4D may be unaware of the failure of link 15B, it may not be possible for customer devices 4D to re-transmit a previous ARP message or transmit a gratuitous ARP message to allow PE 10A to locally learn the L2-L3 binding for customer device 4D. Thus, re-learning of the L2-L3 binding may not happen according to RFC 4732 until the remaining multi-homing PE 10A first receives L3 traffic that requires address resolution and then successfully resolves the address resolution entry based on an ARP or NDP request/reply cycle with customer device 4D. As such according to RFC 7432, the wait for the triggering L3 traffic and the latency of the address resolution messaging defines the time before which the remaining multi-homing PE 10A is able to reintroduce the L2-L3 binding for customer device 4D to remote PE 10C for the EVI 3.

In accordance with techniques described in this disclosure, multi-homing PE router 10A responds to withdrawal message 5 by identifying L2-L3 bindings remotely learned in the EVI 3 control plane, e.g., in EVPN MAC/IP advertisement routes from PE router 10B for customer devices reachable by Ethernet segment 14. For example, PE router 10A may identify MAC/IP advertisement routes advertised by PE router 10B for EVI 3 for customer devices reachable by Ethernet segment 14, e.g., by comparing Ethernet Segment Identifier (ESI) fields of the MAC/IP advertisement routes with the ESI configured for Ethernet segment 14 and/or by comparing route targets of the MAC/IP advertisement routes with route targets configured for EVI 3 on PE router 10B.

For each identified L2-L3 binding, PE router 10A may create a dynamic address resolution entry with the L2-L3 binding and add the address resolution entry to an address resolution table, e.g., an ARP or NDP table of the PE router 10A kernel. For example, PE router 10A may create an ARP entry that specifies a MAC address and IP address for customer device 4D. PE router 10A may create the ARP entry "proactively," i.e., without waiting for the arrival of layer 3 traffic from customer device 4D that might trigger an address resolution process (e.g., ARP).

In some cases, the PE router 10A does not create the dynamic address resolution entry with an identified L2-L3 binding for a customer device 4 if the PE router 10A has already locally learned the L2-L3 binding on the attachment circuit for customer network 6B to the EVI 3 (link 15A in the example of FIG. 1).

Based on the dynamic addition of the address resolution entry to the address resolution table with the L2-L3 binding for customer device 4D, PE 10A may further generate and output an L2-L3 advertisement 18 that includes the L2-L3 binding for customer device 4D to the other PEs 10 in the EVI 3. For example, the L2-L3 advertisement 18 may represent a MAC/IP advertisement route that include a MAC address and IP address for customer device 4D.

The techniques may provide one or more advantages. For example, by installing the L2-L3 bindings learned via the EVPN control plane from the PE router 10B with the failed link 15B, multi-homing PE router 10A for Ethernet segment 14 may forward incoming L3 traffic requiring an L3 lookup without having to locally resolve an L2 address for the customer device 4D associated with the L2-L3 bindings using, e.g., Address Resolution Protocol (ARP) requests or Neighbor Discovery Protocol (NDP) neighbor solicitation. As another example, by advertising the L2-L3 bindings to remote PE routers 10 via the EVPN control plane, the multi-homing PE router 10A may enable remote PE routers of the multi-homed site to learn the L2-L3 bindings association with the multi-homing PE router and more quickly solicit EVPN traffic from the remote PE routers for the L2-L3 bindings proactively, i.e., without having to first locally learn/resolve the L2-L3 bindings prior to advertisement. In this way, the techniques may improve network convergence.

Figure 2:
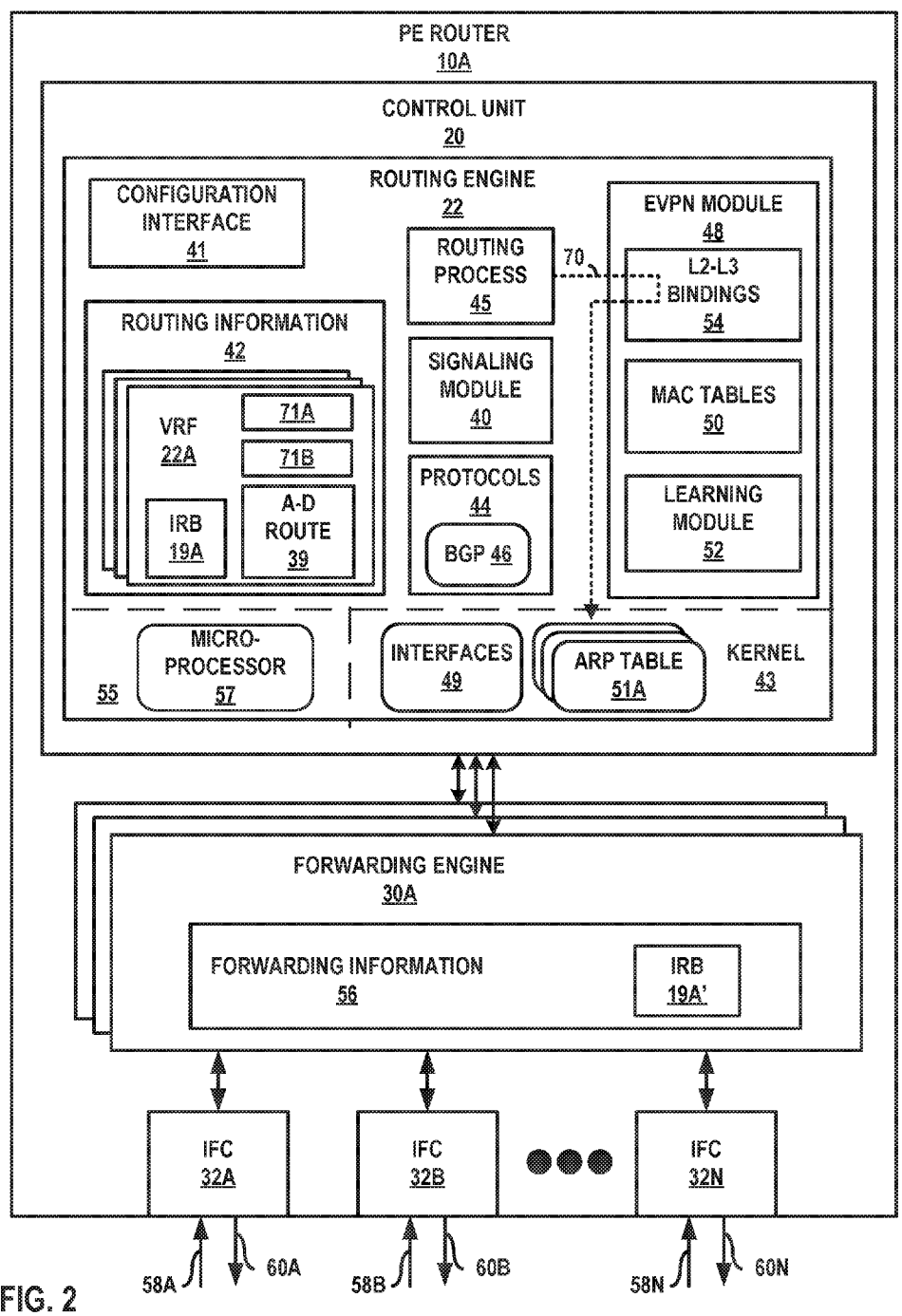
FIG. 2 is a block diagram illustrating further details of a network device that uses remotely-learned L2-L3 binding information, in accordance with techniques of the disclosure.

FIG. 2 is a block diagram illustrating further details of a network device that uses remotely-learned L2-L3 binding information, in accordance with techniques of the disclosure. PE 10A includes a control unit 20 that includes a routing engine 22, and control unit 20 is coupled to forwarding engines 30A-30N. Each of forwarding engines 30 is associated with one or more interface cards 32A-32N ("IFCs 32") that receive packets via inbound links 58A-58N ("inbound links 58") and send packets via outbound links 60A-60N ("outbound links 60"). IFCs 32 are typically coupled to links 58, 60 via a number of interface ports (not shown). Inbound links 58 and outbound links 60 may represent physical interfaces, logical interfaces, or some combination thereof.

Elements of control unit 20 and forwarding engines 30 may be implemented solely in software, or hardware, or may be implemented as combinations of software, hardware, or firmware. For example, control unit 20 may include one or more processors, one or more microprocessors, digital signal processors (DSPs), application specific integrated circuits (ASICs), field programmable gate arrays (FPGAs), or any other equivalent integrated or discrete logic circuitry, or any combination thereof, which execute software instructions. In that case, the various software modules of control unit 20 may comprise executable instructions stored, embodied, or encoded in a computer-readable medium, such as a computer-readable storage medium, containing instructions. Instructions embedded or encoded in a computer-readable medium may cause a programmable processor, or other processor, to perform the method, e.g., when the instructions are executed. Computer-readable storage media may include random access memory (RAM), read only memory (ROM), programmable read only memory (PROM), erasable programmable read only memory (EPROM), electronically erasable programmable read only memory (EEPROM), non-volatile random access memory (NVRAM), flash memory, a hard disk, a CD-ROM, a floppy disk, a cassette, a solid state drive, magnetic media, optical media, or other computer-readable media. Computer-readable media may be encoded with instructions corresponding to various aspects of PE router 10A, e.g., protocols, processes, and modules. Control unit 20, in some examples, retrieves and executes the instructions from memory for these aspects.

Routing engine 22 includes kernel 43, which provides a run-time operating environment for user-level processes. Kernel 43 may represent, for example, a UNIX operating system derivative such as Linux or Berkeley Software Distribution (BSD). Kernel 43 offers libraries and drivers by which user-level processes may interact with the underlying system. Hardware environment 55 of routing engine 22 includes microprocessor 57 that executes program instructions loaded into a main memory (not shown in FIG. 2) from a storage device (also not shown in FIG. 2) in order to execute the software stack, including both kernel 43 and processes executing on the operating environment provided by kernel 43. Microprocessor 57 may represent one or more general- or special-purpose processors such as a digital signal processor (DSP), an application specific integrated circuit (ASIC), a field programmable gate array (FPGA), or any other equivalent logic device. Accordingly, the terms "processor" or "controller," as used herein, may refer to any one or more of the foregoing structures or any other structure operable to perform techniques described herein.

Kernel 43 provides an operating environment for a routing process 45 that executes various protocols 44 at different layers of a network stack, including protocols for implementing Ethernet Virtual Private Networks. For example, routing engine 22 includes network protocols that operate at a network layer of the network stack. In the example of FIG.

2, network protocols include the Border Gateway Protocol (BGP) 46, which is a routing protocol. BGP 46 may include Multiprotocol BGP (MP-BGP). Routing engine 22 may include other protocols not shown in FIG. 2, such as an MPLS label distribution protocol and/or other MPLS protocols. Routing engine 22 is responsible for the maintenance of routing information 42 to reflect the current topology of a network and other network entities to which PE 10A is connected. In particular, routing protocols periodically update routing information 42 to accurately reflect the topology of the network and other entities based on routing protocol messages received by PE 10A.

As shown in FIG. 2, PE 10A may be configured with multiple VRFs including VRF 22A. VRF 22A represents a virtual routing and forwarding instance. VRF 22A includes at least one routing table for BGP 46. An attachment circuit, as shown in FIG. 1, may be associated with a particular VRF, such as VRF 22A, and the particular VRF may be configured to forward traffic for the attachment circuit.

Forwarding engines 30A-30N ("forwarding engines 30" or "forwarding units") represent hardware and logic functions that provide high-speed forwarding of network traffic. Forwarding engines 30 typically includes a set of one or more forwarding chips programmed with forwarding information that maps network destinations with specific next hops and the corresponding output interface ports. In general, when PE 10A receives a packet via one of inbound links 58, one of forwarding engines 30 identifies an associated next hop for the data packet by traversing the programmed forwarding information based on information within the packet. One of forwarding engines 30 (either the ingress forwarding engine or a different egress forwarding engine) forwards the packet on one of outbound links 60 mapped to the corresponding next hop. Kernel 43 may generate forwarding information 56 to include representations of information stored to VRFs 22, interfaces 49, and ARP tables 51, in the form of forwarding information for optimized forwarding by forwarding engines 30.

In the example of FIG. 2, forwarding engine 30A includes forwarding information 56. In accordance with routing information 42, forwarding engine 30A stores forwarding information 56 that maps packet field values to network destinations with specific next hops and corresponding outbound interface ports. For example, routing engine 22 analyzes routing information 42 and generates forwarding information 56 in accordance with routing information 42. Forwarding information 56 may be maintained in the form of one or more tables, link lists, radix trees, databases, flat files, or any other data structures.

Forwarding engine 30A stores forwarding information 56 for each Ethernet VPN Instance (EVI) established by PE 10A to associate network destinations with specific next hops and the corresponding interface ports. As described in FIG. 1, an EVI may be associated with one or more Ethernet segments in an EVPN. In general, when PE 10A receives a data packet from a given Ethernet segment via one of inbound links 58, forwarding engine 30A, for example, identifies an associated next hop for the data packet by traversing forwarding information 56 based on information (e.g., labeling or header information) within the packet. Forwarding engine 30A forwards the data packet on one of outbound links 60 to the corresponding next hop in accordance with forwarding information 56 associated with the Ethernet segment. At this time, forwarding engine 30A may push and/or pop labels from the packet to forward the packet along a correct LSP.

Routing engine 23 includes a configuration interface 41 that receives and may report configuration data for PE 10A. Configuration interface 41 may represent a command line interface; a graphical user interface; Simple Network Management Protocol (SNMP), Netconf, or another configuration protocol; or some combination of the above in some examples. Configuration interface 41 receives configuration data configuring the PE 10A with VRFs 22, interfaces 49, and other constructs that at least partially define the operations for PE 10A.

Routing engine 23 also includes an EVPN module 48 having a learning module 52 that performs layer two (L2) learning. Learning module 52 may perform remote learning using BGP 46. EVPN module 48 may maintain MAC tables 50 for each EVI established by PE 20, or in alternative examples may maintain one or more MAC tables 50 that are independent of each respective EVI. One of MAC tables 50, for instance, may represent a virtual routing and forwarding table of VRFs 22A for an EVI configured for VRF 22A and for which IRB 19A is a routing interface. Learning module 52 may alternatively be configured for execution, in full or in part, by forwarding engine 30A. In some examples, EVPN module 48 may be part of or executed by routing process 45.

Learning module 52 may perform local L2/L3 (e.g., MAC/IP) binding learning by, e.g., using MAC and IP address information received by PE 10A in ARP or NDP messages. Learning module 52 may detect a new MAC address on an EVI access interface (e.g., link 15A of FIG. 1) for an EVI and add the MAC address, with a mapping to the EVI access interface, to one of the MAC tables 50 for the EVI. Learning module 52 may then advertise an EVPN MAC/IP advertisement route using BGP 46 to remote PEs for the EVI. The MAC advertisement route may include a route target corresponding to the EVI, the MAC address, the Ethernet tag for the bridge domain in which the MAC address was learned, the ESI in which the MAC address was learned, the IP address corresponding to the MAC address (if known and if an IRB is configured for the bridge domain, e.g., IRB 19A), and an EVPN label. With remote MAC learning, learning module 52 may receive an EVPN MAC/IP advertisement route from another PE and install a host route for the IP address (if included) with protocol type EVPN to the appropriate VRF 22 for the EVI and install the MAC address in the MAC table 50 of the EVI, as well as the MAC information associated with the host route in the VRF 22 including the EVPN label.

EVPN module 48 may maintain one or more L2 address-L3 address (L2-L3) bindings 54 received and learned from peer PE routers (e.g., 10B, 10C) for the EVI via BGP 46. Each L2-L3 binding 54 can map an L3 address for a host connected to the peer PE router via an Ethernet segment to an L2 address for the host. For example, a L2-L3 binding 54 may map an IP address configured for customer device 4C connected to PE router 10A via the Ethernet segment 14 to a MAC address configured for customer device 4C. In some examples, L2-L3 bindings 54 may be stored in a distinct binding table or other data structure. In some examples, L2-L3 bindings 54 may be stored in ARP (or NDP) tables 51. In some examples, L2-L3 bindings 54 may be stored as routing advertisements generated by PE router 10A using information from ARP tables 51 or received from other PE routers 10 for an EVI.

Signaling module 40 outputs control-plane messages to automatically establish tunnels such as LSPs, Ethernet Segments, and otherwise provision one or more EVPNs between PE 10A and each of the other PE routers 10.

Signaling module 40 may signal the PE routers 10 using one or more suitable L3 protocols, such as BGP 46. Signaling module 40 can communicate with forwarding engine 30A to automatically update forwarding information 56. In some examples, signaling module 40 may be part of or executed by routing process 45.

EVPN module 48 additionally manages the EVPN multi-homing mode of operation for PE 10A. That is, EVPN module 48 operates to maintain EVPN service and traffic forwarding to and from CEs multi-homed to PE 10A and one or more other routers (e.g., PE 10B in the example topology of FIG. 1). For example, in the event of a network failure such as a PE 10A, 10B to CE 8 link 15A, 15B failure; a failure of any of PEs 10A, 10B; or an MPLS-reachability or other type of tunneling failure between any of PEs 10A, 10B and the remote PE 10; EVPN module 48 coordinates with PE 10B to ensure that PEs 10A, 10B continue to operate in an active-active redundancy mode, and rapidly converge to a state of having the same topological information about the network in which the PEs operate (i.e., network convergence).

VRF 22A is further configured with a routing interface of IRB 19A, the logical interfaces for which are installed (or "configured") to forwarding information 56 of forwarding engine 30A. Kernel 43 includes an interfaces table 49 ("interfaces 49") that represents a data structure that includes a corresponding entry for each logical interface configured for PE 10A. Interfaces 49 includes an entry for IRB 19A. Entries for respective logical interfaces may specify respective current information describing the logical interfaces. Kernel 43 also executes ARP and/or NDP to generate and inject an ARP request and/or NDP neighbor solicitation into the data plane for output via IFCs 32, as well as receive ARP and/or NDP messages.

Kernel 43 may maintain one or more Address Resolution Protocol (ARP) tables 51A-51N ("ARP tables 51", also referred to as ARP caches). ARP tables 51 represent a data structure storing a plurality of address resolution entries each associating an L2 addresses with a corresponding L3 address that has been learned by PE router 10A (i.e., local learning) for a customer device. Kernel 43 may maintain a separate ARP table 51 per EVI executed by PE router 10A in some instances, or per VRF 22 in some instances.

VRF 22A may store one or more Ethernet Auto-Discovery (A-D) per ES routes 39 received from other PE routers 10B, 10C which indicate the respective PE routers 10B, 10C provide L2 reachability for the Ethernet segment indicated in the route. For example, VRF 22A for the EVI illustrated in FIG. 1 stores an A-D per ES route 39 associated with Ethernet segment 14 and advertised by peer PE router 10B.

Routing process 45 may receive, via BGP 46, an EVPN MAC/IP advertisement route 71A that advertises a MAC/IP binding for a customer device associated with VRF 22A and EVI 3, the route 71A originated by PE 10B. Routing process 45 may import and store the route 71A to a route table for EVI 3 per a route target indicated in the route. Learning module 52 may install this locally learned EVPN routing information to MAC tables 50 and to VRF 22A as described above for remote MAC learning. Learning module 52 may not locally learn the MAC/IP binding for the customer device on a local attachment circuit for Ethernet segment 14. In other words, PE 10A may only learn the MAC/IP binding for the customer device remotely from PE 10B.

Routing process 45 may subsequently receive a withdraw message, such as a BGP UPDATE message originated by PE 10B and withdrawing Ethernet A-D route 39 (e.g., one or more Ethernet A-D per ES routes), indicating a failure of connectivity for PE 10B to the attached Ethernet segment 14. In response to the withdraw message, routing process 45 may determine that VRF 22A includes route 71A having a MAC/IP binding remotely learned from PE 10B. Routing process 45 may therefore send address resolution entry add message 70 to kernel 43 to add an ARP (or NDP in some examples) entry to ARP table 51A specifying the MAC/IP binding. The determination may be further made based on a determination that an ESI specified in route 71A is also configured for PE 10A for the EVI 3. In other words, PE 10A and PE 10B are multi-homing routers for Ethernet segment 14. The addition of the ARP entry may trigger routing process 45 to advertise the MAC/IP binding in an EVPN MAC/IP advertisement route to solicit remote traffic destined for the corresponding customer device to PE 10A attached to Ethernet segment 14 and thus able to exchange L2/L3 packets with the customer device. In addition, routing process 45 may update (or add or replace) a MAC adjacency for PE 10A in MAC tables 50 to specify the local attachment circuit for Ethernet segment 14, in some cases replacing an interface to PE 10B.

Figure 3:
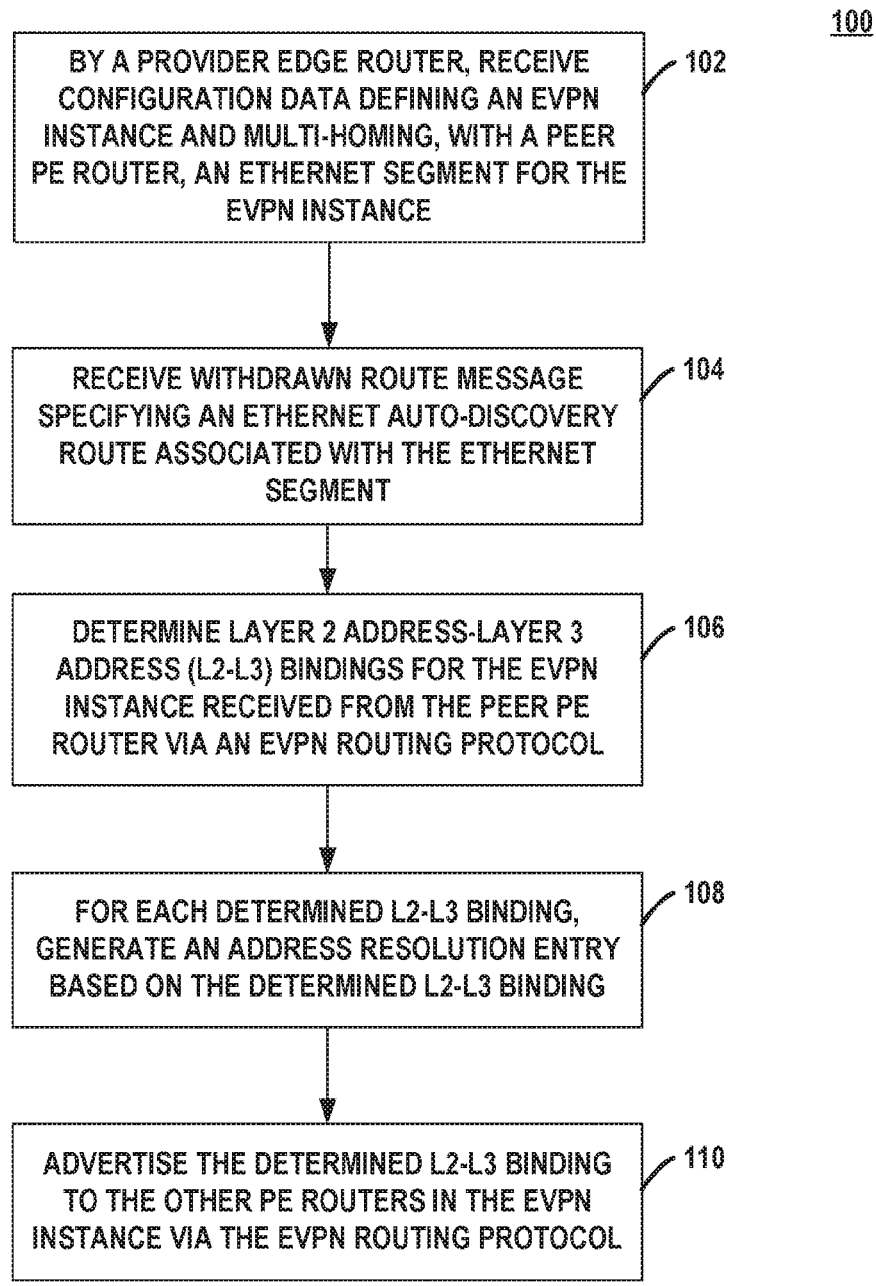
FIG. 3 is a flowchart illustrating an example mode of operation for a provider edge network device to use remotely-learned L2-L3 binding information for an EVPN instance, according to techniques described herein.

FIG. 3 is a flowchart illustrating an example mode of operation for a provider edge network device to use remotely-learned L2-L3 binding information for an EVPN instance, according to techniques described herein. Operation 100 is described with respect to PE router 10A of FIGS. 1-2 but may be performed by any PE network device. PE router 10A receives configuration data defining an Ethernet segment 14 for EVPN instance (EVI) 3 (102). The configuration data configures the PE router 10A to provide active-active multi-homing layer 2 virtual bridge connectivity, together with a peer multi-homing PE router 10B, to a customer network 6B using the Ethernet segment 14. For example, the configuration data configures the PE 10A to multi-home CE 8B for the EVI 3 to PE routers 10A, 10B. EVI 3 configured for VRF 22A may have multiple associated IRBs, including IRB 19A, such that IRB 19A is configured as a routing instance for EVI 3.

PE router 10A may receive numerous EVPN routes for EVI 3 (e.g., BGP EVPN NLRI) from other PE routers 10B, 10C configured to implement EVI 3. For example, PE router 10A may receive, from PE router 10B, an Ethernet A-D route 39 (i.e., EVPN Route Type 1) indicating the ESI for Ethernet segment 14, an MPLS label, and other fields. Ethernet A-D route 39 may represent one or more Ethernet A-D per ES routes. EVPN module 48 may configure one or more of its forwarding engines 30A to apply an MPLS label specified by the Ethernet A-D route as the inner label in network packets that are destined to PE router 10B. In another example, PE router 10A may receive, from PE router 10B, one or more MAC/IP Advertisement routes (i.e., EVPN Route Type 2) associated with the Ethernet segment 14 and that announce the MAC address and corresponding IP addresses of customer device 4C, and the MAC address and corresponding IP address of customer device 4D. EVPN module 48 may store the received MAC/IP bindings 54 in a routing table stored by PE 10A for EVI 3.

PE router 10A may receive, from the peer multi-homing PE router 10B, a withdrawn route message specifying an Ethernet A-D route associated with the Ethernet segment 14 (104). The withdrawn route message (e.g., "withdrawal message 5" of FIG. 1) may be transmitted by the PE router 10B in response to detecting a failed link 15B associated with the Ethernet segment 14. The withdrawn route message may be an BGP UPDATE message indicating an Ethernet A-D route per ESI route as a withdrawn route and specifying Ethernet segment 14, e.g., as MP-UNREACH-NLRI for an MP-BGP UPDATE message.

In response to receiving the withdrawn route message, PE router 10A determines one or more L2-L3 bindings received from the peer multi-homing PE router 10B via an EVPN routing protocol for the EVI for hosts connected to PE router 10A via the Ethernet segment 14 (106). That is, PE router 10A determines all MAC/IP bindings that were learned only from the peer PE router 10B with the failed link 15B via the EVPN control plane (in contrast to via the data plane). For example, routing process 45 of PE router 10A may query MAC table 50, or VRF 22A configured with EVI 3, for all L2-L3 bindings 54 that were received in MAC/IP Advertisement routes for the EVI 3 from PE 10B.

Further in response to receive the withdrawn route message, for each determined L2-L3 binding, PE router 10A generates respective address resolution entries based on the one or more determined L2-L3 bindings (108). Each of the address resolution entries map an L3 address for a host connected to the PE router 10A via the Ethernet segment 14 to an L2 address for the host. For example, routing process 45 may generate an ARP entry (or NDP entry) mapping an IP address for a customer device 4C to a MAC address for the customer device 4C. Routing process 45 installs the address resolution entries, which may be ARP entries (or NDP entries), into an ARP table 51A (or NDP table), as depicted by address resolution entry add message 70 in FIG. 2. Routing process 45 may configure forwarding engine 30A with forwarding information 56 for forwarding L3 traffic according to the generated address resolution entries.

In some examples, routing process 45 requests that kernel 43 generate a dynamic ARP entry and inject the ARP entry into one or more ARP tables 51A. Put another way, routing process 45 programmatically adds the ARP entry for a host's MAC and IP address to the kernel in response to the withdrawn route message without the routing process 45 waiting for the arrival of L3 traffic that might otherwise trigger an ARP resolution process. The ARP entry may be dynamic in the sense the ARP entry is subject to ARP aging procedures within ARP table 51A. The use of a dynamic ARP entry (in contrast to a static entry) enables the kernel 43 to remove ARP entry from the ARP table 51A (due to aging out) should the host's (e.g., customer device 4C's) MAC/IP binding contained therein become invalid contemporarily with the failure of link 15B. Similarly, in examples where more than two multi-homing PEs are attached to the failed site, there may be a situation in which not all of the remaining PEs would continue to refresh the ARP binding for the host due to LAG hashing mechanics. Any PE that does not refresh the ARP binding eventually removes the ARP binding due to aging procedures, ensuring that state injected to improve L3 convergence at the same of the ESI failure is eventually cleaned up if unnecessary.

PE router 10A advertises the one or more L2-L3 bindings to the other PE routers 10B, 10C in EVI 3 via the EVPN control plane (110). EVPN module 48 may generate and transmit one or more EVPN MAC/IP Advertisement routes (Type 2) based on the generated address resolution entries. In doing so, PE router 10A is able to advertise the L2-L3 bindings for customer devices 4C and 4D sooner than otherwise, such that other remote EVPN PE routers 10B and 10C) may forward traffic for customer devices 4C and 4D to the PE router 10A without PE router 10A having locally learned the L2-L3 bindings.

Figure 4:
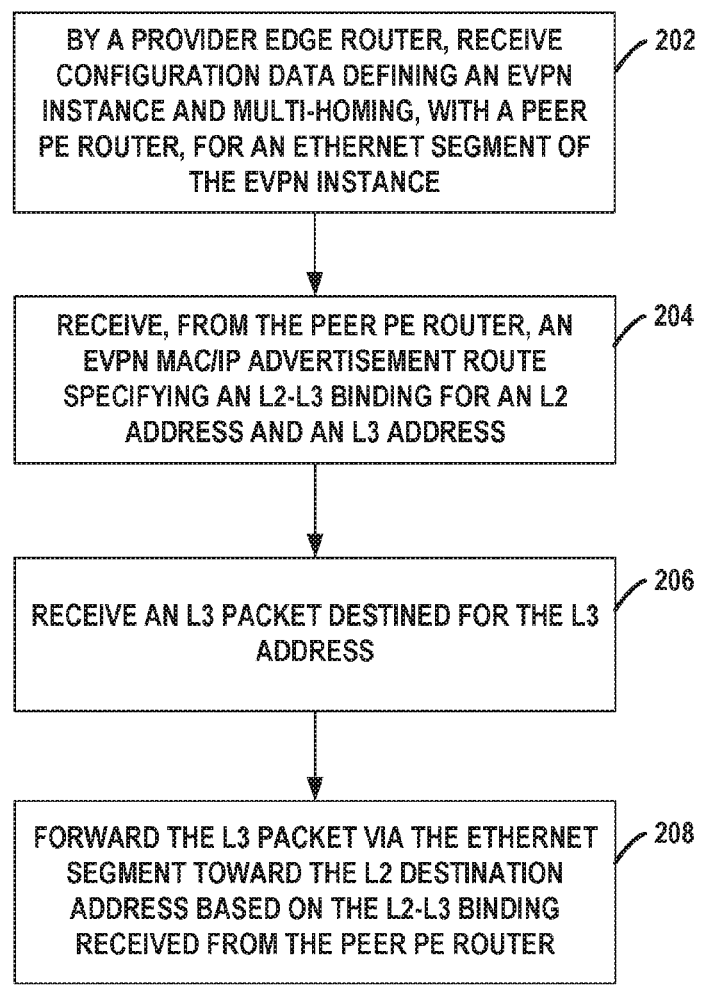
FIG. 4 is a flowchart illustrating an example mode of operation for a provider edge network device to use remotely-learned L2-L3 binding information for an EVPN instance, according to techniques described herein.

FIG. 4 is a flowchart illustrating an example mode of operation for a provider edge network device to use remotely-learned L2-L3 binding information for an EVPN instance, according to techniques described herein. Operation 200 is described with respect to PE router 10A of FIGS. 1-2 but may be performed by any PE network device. PE router 10A receives configuration data defining an Ethernet segment 14 for EVPN instance (EVI) 3 (202). The configuration data configures the PE router 10A to provide active-active multi-homing layer 2 virtual bridge connectivity, together with a peer multi-homing PE router 10B, to a customer network 6B using the Ethernet segment 14. For example, the configuration data configures the PE 10A to multi-home CE 8B for the EVI 3 to PE routers 10A, 10B. EVI 3 configured for VRF 22A may have multiple associated IRBs, including IRB 19A, such that IRB 19A is configured as a routing instance for EVI 3.

PE router 10A may receive an EVPN MAC/IP advertisement route originated by multi-homing peer PE router 10B advertising an L2-L3 binding for a customer device reachable by the Ethernet segment, the L2-L3 binding associating a layer 2 address (e.g., MAC address) with a layer 3 address (e.g., IPv4/IPv6 address) configured for the customer device (204). Subsequently, PE router 10A may receive, via intermediate network 12, an L3 data packet for the EVI 3 having a destination L3 address specifying the L3 address configured for the customer device (206). The PE router 10A may forward the L3 data packet via Ethernet segment 14 to the L2 address configured for the customer device based on the L2-L3 binding in the EVPN MAC/IP advertisement route received from PE router 10B (208). To forward the L3 data packet, the PE router 10A may generate an L2 packet that includes the L3 data packet encapsulated by an L2 header that includes the L2 address of the L2-L3 binding. As described with respect to mode of operation 100 of FIG. 3, PE router 10A may generate an address resolution entry for the L2-L3 binding in response to receiving an Ethernet A-D per ES route withdrawal for the Ethernet segment 14 from PE router 10B, and add the address resolution entry to a PE router 10A kernel. PE router 10A may forward the L3 data packet based on the address resolution entry.

In this way, PE router 10A may forward the L3 packet to the L2 destination address determined from an L2-L3 binding received from the multi-homing peer PE router 10B for the Ethernet segment 14. In doing so, PE router 10A may forward traffic to a host/customer device in the customer network 6B according to the generated address resolution entries without locally learning the L2-L3 binding for the host/customer device on a local attachment circuit for the EVI 3.

The techniques described in this disclosure may be implemented, at least in part, in hardware, software, firmware, or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform one or more of the techniques of this disclosure.

Such hardware, software, and firmware may be implemented within the same device or within separate devices to support the various techniques described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware, firmware, or software components. Rather, functionality associated with one or more modules or units may be performed by separate hardware, firmware, or software components, or integrated within common or separate hardware, firmware, or software components.

The techniques described in this disclosure may also be embodied or encoded in an article of manufacture including a computer-readable medium encoded with instructions. Instructions embedded or encoded in an article of manufacture including a computer-readable medium encoded, may cause one or more programmable processors, or other processors, to implement one or more of the techniques described herein, such as when instructions included or encoded in the computer-readable medium are executed by the one or more processors. Computer readable storage media may include random access memory (RAM), read only memory (ROM), programmable read only memory (PROM), erasable programmable read only memory (EPROM), electronically erasable programmable read only memory (EEPROM), flash memory, a hard disk, a compact disc ROM (CD-ROM), a floppy disk, a cassette, magnetic media, optical media, or other computer readable media. In some examples, an article of manufacture may include one or more computer-readable storage media. In some examples, a computer-readable storage media may include non-transitory media. The term "non-transitory" may indicate that the storage medium is not embodied in a carrier wave or a propagated signal. In certain examples, a non-transitory storage medium may store data that can, over time, change (e.g., in RAM or cache).

Various embodiments of the invention have been described. These and other embodiments are within the scope of the following claims.

What is claimed is:

1. A method comprising:
receiving, by a first provider edge (PE) device of a layer 3 network, configuration data configuring the first PE device to provide, via an Ethernet segment with a customer network, active-active multi-homing layer 2 (L2) virtual bridge connectivity to the customer network using an Ethernet Virtual Private Network (EVPN) instance and layer 3 (L3) routing using an integrated routing and bridging (IRB) interface that is a L3 routing interface assigned to the EVPN instance;
receiving, by the first PE device from a second PE device of the EVPN instance, an EVPN route comprising an L2-L3 binding for a customer device of the customer network and associating the L2-L3 binding with the Ethernet segment, the L2-L3 binding comprising an L2 address and an L3 address that are assigned to the customer device,
wherein the second PE device provides, with the first PE device and via the Ethernet segment, active-active multi-homing L2 virtual bridge connectivity to the customer network; and
forwarding, by the first PE device via the Ethernet segment and based at least on the L2-L3 binding received from the second PE device, an L3 packet to the customer device.

2. The method of claim 1, further comprising:
by the first PE device in response to receiving, from the second PE device, an indication to withdraw an Ethernet Auto-Discovery (A-D) route associated with the Ethernet segment:
determining the L2-L3 binding received from the second PE device is associated with the Ethernet segment; and
generating an address resolution entry based on the L2-L3 binding received from the second PE device, wherein the address resolution entry associates the L2 address and the L3 address that are assigned to the customer device,
wherein forwarding the L3 packet to the customer device comprises forwarding, by the first PE device based on the address resolution entry, the L3 packet to the customer device.

3. The method of claim 2, wherein the address resolution entry comprises one of an Address Request Protocol (ARP) entry and a Neighbor Discovery Protocol (NDP) entry, the method further comprising:
installing, by the first PE device, the address resolution entry to one of an ARP table or NDP table.

4. The method of claim 2, further comprising:
sending, by the first PE device in response to generating the address resolution entry and via a routing protocol, the L2-L3 binding received from the second PE device to a PE device of the EVPN instance.

5. The method of claim 2, wherein generating the address resolution entry based on the L2-L3 binding comprises generating, by the first PE device, the address resolution entry based on the L2-L3 binding only if the L2-L3 binding is not already locally learned by the first PE device on a local attachment circuit for the EVPN instance.

6. The method of claim 1, further comprising:
sending, by the first PE device via a routing protocol, the L2-L3 binding received from the second PE device to a PE device of the EVPN instance.

7. The method of claim 6, wherein sending the L2-L3 binding to the PE device of the EVPN instance comprises:
outputting, by the first PE device, an EVPN MAC/IP advertisement message for the EVPN instance and comprising the L2-L3 binding received from the second PE device.

8. The method of claim 1, wherein the EVPN route comprising the L2-L3 binding comprises an EVPN MAC/IP Advertisement route.

9. The method of claim 1, wherein forwarding the L3 packet to the customer device comprises forwarding, by the first PE device, the L3 packet without the first PE device storing an address resolution entry for the L2-L3 binding for the customer device locally learned on a local attachment circuit for the EVPN instance.

10. The method of claim 1, wherein forwarding the L3 packet to the customer device comprises generating, based on the L2-L3 binding, an L2 packet comprising the L3 packet and an L2 header having a destination L2 address that is the L2 address of the L2-L3 binding.

11. A network device configured as a provider edge (PE) device of a layer 3 network, comprising:
one or more processors coupled to a memory,
wherein the one or more processors are configured to receive configuration data that configures the network device to provide, via an Ethernet segment with a customer network, active-active multi-homing layer 2 (L2) virtual bridge connectivity to the customer network using an Ethernet Virtual Private Network (EVPN) instance and layer 3 (L3) routing using an integrated routing and bridging (IRB) interface that is a L3 routing interface assigned to the EVPN instance,
wherein the one or more processors are configured to receive, from a peer PE device of the EVPN instance, an EVPN route comprising an L2-L3 binding for a customer device of the customer network and associating the L2-L3 binding with the Ethernet segment, the L2-L3 binding comprising an L2 address and an L3 address that are assigned to the customer device, wherein the peer PE device provides, with the network device and via the Ethernet segment, active-active multi-homing L2 virtual bridge connectivity to the customer network; and
wherein the one or more processors are configured to forward, via the Ethernet segment and based at least on the L2-L3 binding received from the peer PE device, an L3 packet to the customer device.

12. The network device of claim 11,
wherein the one or more processors are further configured to, in response to receiving, from the peer PE device, an indication to withdraw an Ethernet Auto-Discovery (A-D) route associated with the Ethernet segment:
determine the L2-L3 binding received from the peer PE device is associated with the Ethernet segment; and
generate an address resolution entry based on the L2-L3 binding received from the peer PE device, wherein the address resolution entry associates the L2 address and the L3 address that are assigned to the customer device,
wherein the one or more processors configured to forward the L3 packet to the customer device is further configured to forward, based on the address resolution entry, the L3 packet to the customer device.

13. The network device of claim 12,
wherein the address resolution entry comprises one of an Address Request Protocol (ARP) entry and a Neighbor Discovery Protocol (NDP) entry,
wherein the one or more processors are further configured to install the address resolution entry to one of an ARP table or NDP table.

14. The network device of claim 12, the one or more processors are further configured to send, in response to generating the address resolution entry and via a routing protocol, the L2-L3 binding received from the peer PE device to a PE device of the EVPN instance.

15. The network device of claim 12, wherein the one or more processors are further configured to generate the address resolution entry based on the L2-L3 binding only if the L2-L3 binding is not already locally learned by the network device on a local attachment circuit for the EVPN instance.

16. The network device of claim 11, the one or more processors are further configured to send, via a routing protocol, the L2-L3 binding received from the peer PE device to a PE device of the EVPN instance.

17. The network device of claim 16, wherein, to send the L2-L3 binding to the peer PE device of the EVPN instance, the one or more processors are further configured to output an EVPN MAC/IP advertisement message for the EVPN instance and comprising the L2-L3 binding received from the peer PE device.

18. The network device of claim 11, wherein the EVPN route comprising the L2-L3 binding comprises an EVPN MAC/IP Advertisement route.

19. The network device of claim 11, wherein, to forward the L3 packet to the customer device, the one or more processors are further configured to forward the L3 packet without the network device storing an address resolution entry for the L2-L3 binding for the customer device locally learned on a local attachment circuit for the EVPN instance.

20. A non-transitory computer-readable medium comprising instructions for causing one or more programmable processors of a first provider edge (PE) device of a layer 3 network to:
receive, by the first PE device, configuration data configuring the first PE device to provide, via an Ethernet segment with a customer network, active-active multi-homing layer 2 (L2) virtual bridge connectivity to the customer network using an Ethernet Virtual Private Network instance and layer 3 (L3) routing using an integrated routing and bridging (IRB) interface that is a L3 routing interface assigned to the EVPN instance;
receive, by the first PE device from a second PE device of the EVPN instance, an EVPN route comprising an L2-L3 binding for a customer device of the customer network and associating the L2-L3 binding with the Ethernet segment, the L2-L3 binding comprising an L2 address and an L3 address that are assigned to the customer device,
wherein the second PE device provides, with the first PE device and via the Ethernet segment, active-active multi-homing L2 virtual bridge connectivity to the customer network; and
forward, by the first PE device via the Ethernet segment and based at least on the L2-L3 binding received from the second PE device, an L3 packet to the customer device.

* * * * *